United States Patent
Takigawa et al.

(10) Patent No.: US 7,548,713 B2
(45) Date of Patent: Jun. 16, 2009

(54) DRIVE TRANSMITTING DEVICE, AND IMAGE FORMING APPARATUS

(75) Inventors: Junya Takigawa, Tokyo (JP); Yoshimi Asayama, Mie (JP)

(73) Assignees: Ricoh Company, Limited, Tokyo (JP); NTN Corporation, Osaka (JP)

(*) Notice: Subject to any disclaimer, the term of this patent is extended or adjusted under 35 U.S.C. 154(b) by 127 days.

(21) Appl. No.: 11/626,619

(22) Filed: Jan. 24, 2007

(65) Prior Publication Data
US 2007/0201901 A1 Aug. 30, 2007

(30) Foreign Application Priority Data
Feb. 28, 2006 (JP) .............................. 2006-052991

(51) Int. Cl.
G03G 15/00 (2006.01)
(52) U.S. Cl. .................... 399/167; 399/88; 464/139
(58) Field of Classification Search ................ 399/167, 399/159, 88, 116, 117; 464/139, 145, 146
See application file for complete search history.

(56) References Cited

U.S. PATENT DOCUMENTS

| | | | | |
|---|---|---|---|---|
| 5,855,519 A | * | 1/1999 | Kadota | ....................... 464/145 |
| 7,155,145 B2 | * | 12/2006 | Iwasaki et al. | .............. 399/167 |
| 2005/0281586 A1 | * | 12/2005 | Ohashi et al. | ............... 399/167 |
| 2006/0061829 A1 | * | 3/2006 | Yamazaki et al. | .......... 358/300 |
| 2006/0067737 A1 | * | 3/2006 | Yamazaki et al. | ........... 399/167 |

FOREIGN PATENT DOCUMENTS

| | | |
|---|---|---|
| JP | 52-34699 | 9/1977 |
| JP | 2000-221863 | 8/2000 |
| JP | 2003-57855 | 2/2003 |
| JP | 2006-163232 A * | 6/2006 |

* cited by examiner

Primary Examiner—Sophia S Chen
(74) Attorney, Agent, or Firm—Oblon, Spivak, McClelland, Maier & Neustadt, P.C.

(57) ABSTRACT

In a driving motor that rotates and drives a rotor by a magnetic force generated between a rotor and a stator, a constant velocity joint that transmits a rotation driving force between a driving-side rotating member and a driven-side rotating member. The driving-side rotating member and the driven-side rotating member align in an axial direction and engage with each other. The driving-side rotating member is directly connected to the rotor to function as a driving shaft.

14 Claims, 10 Drawing Sheets

DRIVE TRANSMITTING DEVICE, AND IMAGE FORMING APPARATUS

CROSS-REFERENCE TO RELATED APPLICATIONS

The present document incorporates by reference the entire contents of Japanese priority document, 2005-052991 filed in Japan on Feb. 28, 2006.

BACKGROUND OF THE INVENTION

1. Field of the Invention

The present invention relates to a drive transmitting device and an image forming apparatus using the same.

2. Description of the Related Art

In an image forming apparatus such as copiers, facsimiles, and printers, it has been common that an image is formed and carried by the surface movement of endless moving members such as rollers and endless belts. For example, in an electrophotographic image forming apparatus, endless surface movement of a latent image carrying member in a form of a rotating drum is used to form a latent image based on light scanning, develop it, and carry a visible image obtained by developing to a transfer position. Endless surface movement of a developing roller that rotates is used to carry a developer to a visible image on a latent image carrying member. Additionally, endless surface movement of an endless intermediate transfer belt is used to carry its surface to a transfer position corresponding to a photoconductor and to transfer a visible image on the photoconductor to a surface of the belt.

The image forming apparatus having such a configuration may produce adverse effects on an image due to variation of surface velocity (hereinafter, "velocity variation") in an endless moving member. A tandem system of image forming apparatus disclosed in Japanese Patent Application Laid-open No. H15-57855 particularly causes color displacements due to velocity variation of a latent image carrying member. A tandem system is a system that visible images of different colors that are each formed on a plurality of latent image carrying members are overlapped and transferred onto a transfer member to form a multicolor image. The latent image carrying members generate velocity variation on an individual circle basis respectively so that the visible images of each color are transferred with their positions deviated one another, causing color deviation.

Velocity variation in an endless moving member is caused by various factors. For example, a configuration of transmitting a driving force from a driving motor to an endless moving member through a plurality of gears causes velocity variation of an endless moving member due to overlap of velocity variation of rotating gears based on decentering of an individual gear and a difference in mating gears. On the contrary, in a configuration of arranging an endless moving member and a driving motor on a straight line and each other's rotating shaft end surfaces are faced each other to couple a rotation driving force through coupling at each other's opposed positions, velocity variation of an endless moving member due to decentering of a gear or a difference in mating gears does not occur. Instead, in a relation that a driving shaft of a driving motor and a rotation shaft of an endless moving member are skew due to an imposed difference, velocity variation of an endless moving member may occur.

On the other hand, a constant velocity joint as disclosed in Japanese Published Examined Patent Application No. S52-34699 has been widely known as one of drive transmitting mechanisms that transmit a rotation driving force from a driving source to a driven member such as a vehicle shaft. The constant velocity joint is used to couple a rotation driving force between a driving source (a motor or an engine) and a driven member that are arranged each other on a straight line in the same manner as through coupling, allowing an angle of deviation between a driving shaft and a driven member and enabling transmitting a rotation driving force between both of them at constant velocity.

However, because a constant velocity joint is originally used to transmit rotation velocity on a driving side directly to a driven side, when the driving side rotates with velocity variation, the variation is directly transmitted to the driven side. Therefore, it is necessary to rotate a driving-side rotating member of a constant velocity joint without velocity variation to drive a driven member without velocity variation. When a driving-side rotating member of a constant velocity joint and a driving shaft of a driving motor are connected under shaft misalignment due to an imposed difference, however, even if the driving shaft of the driving motor rotates without velocity variation, the driving-side rotating member of the constant velocity joint rotates with velocity variation. As a result, this causes velocity variation of a driven member such as a latent image carrying member.

SUMMARY OF THE INVENTION

It is an object of the present invention to at least partially solve the problems in the conventional technology.

According to an aspect of the present invention, a drive transmitting device includes a constant velocity joint that transmits a rotation driving force between a driving-side rotating member and a driven-side rotating member that align in an axial direction and engage each other, and a driving motor that is connected to the driving-side rotating member. A rotation driving force of the driving motor is transmitted to a driven member through the constant velocity joint. Any one of the driving-side rotating member and the driven-side rotating member includes an outer ring, an inner ring that is located inside the outer ring, a cylindrical space between the outer ring and the inner ring, and a plurality of grooves that extend in an axial direction of the cylindrical space and are located on at least one of the inner peripheral surface of the outer ring and the outer peripheral surface of the inner ring to align in the circular direction. The other one of the driving-side rotating member and the driven-side rotating member includes a ball holding member that holds a plurality of balls in a plurality of through-holes in a cylindrical peripheral wall that align in a circumferential direction. The constant velocity joint transmits the rotation driving force between the driving-side rotating member and the driven-side rotating member via the balls when the ball holding member is arranged in the cylindrical space and the balls are engaged in the grooves. The driving-side rotating member is directly connected to a rotor as a driving shaft of the driving motor.

According to another aspect of the present invention, an image forming apparatus includes an image carrying member that carries a visible image on an endless moving surface, a visible-image forming member that forms a visible image on the endless moving surface, and the above drive transmitting device that transmits a driving force to the image carrying member.

According to still another aspect of the present invention, an image forming apparatus includes a latent image carrying member that carries a latent image on an endless moving surface, a developing member that develops the latent image on the latent image carrying member by a developer carried on the endless moving surface, and the above drive transmitting device that transmits a driving force to any one of the latent image carrying member and the developing member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
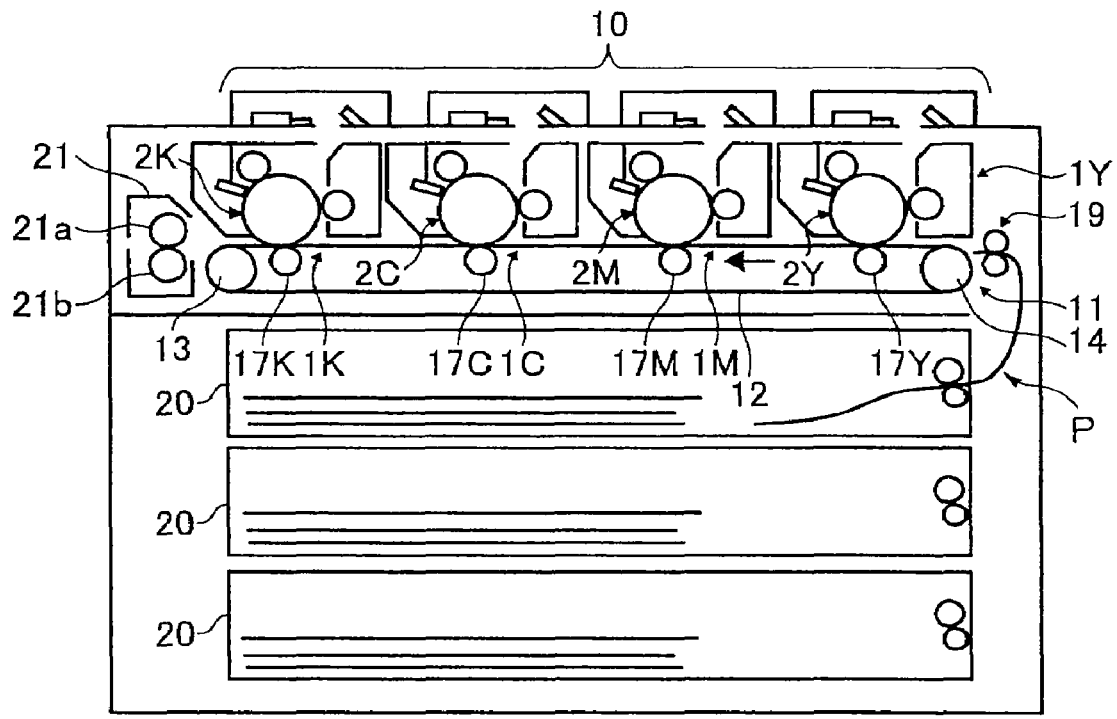
FIG. 1 is a schematic side view of a printer according to an embodiment of the present invention.

Exemplary embodiments of the present invention are explained below with reference to the accompanying drawings. In the following embodiments, the present invention is applied to an electrophotographic color laser printer (hereinafter, "printer") as an image forming apparatus. FIG. 1 is a schematic of a printer according to an embodiment of the present invention. The printer includes with four process units 1Y, 1M, 1C, and 1K to form images of respective colors: yellow (Y), magenta (M), cyan (C), and black (K). In the following, respective members for yellow, magenta, cyan, and black colors are indicated by reference numerals or characters with alphabet letters Y, M, C, and K. In addition to the process units 1Y, 1M, 1C, and 1K, the printer includes an optical writing unit 10, a transfer unit 11, a resist roller pair 19, three paper feeding cassettes 20, and a fining unit 21.

The optical writing unit 10 includes four light writing sub-units. Each of the light writing sub-units has a light source, a polygon mirror, an f-θ lens, a reflecting mirror, and the like and irradiates a surface of a later-described photoconductor with a laser beam based on image data.

Figure 2:
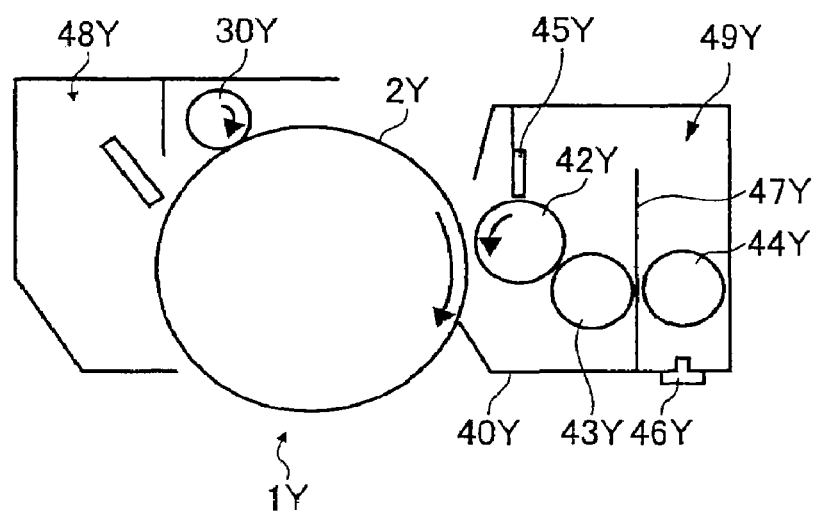
FIG. 2 is an enlarged schematic of a Y process unit for shown in FIG. 1.

FIG. 2 is an enlarged view of the process unit 1Y of the four process units 1Y, 1M, 1C, and 1K. Each of the other process units 1M, 1C, and 1E has the same configuration as that of the process unit 1Y and the explanation thereof is omitted. In FIG. 2, the process unit 1Y has a drum-shaped photoconductor 2Y, a charging device 30Y, a developing device 40Y, and a drum cleaning device 48Y.

The charging device 30Y makes a charging roller on which charging bias is applied come into contact with or come into close contact with the photoconductor 2Y. Electric discharge generated between the charging roller and the photoconductor 2Y causes the whole surface of the photoconductor to be charged. A laser beam modulated and deflected by the optical writing unit 10 is emitted on the charged surface of the photoconductor 2Y while scanning. Then, an electrostatic latent image is formed on the surface of the drum. The formed electrostatic latent image is developed by the developing device 40Y to form a Y toner image.

The developing device 40Y includes a developing sleeve 42Y, which is a developing member, arranged to expose part of its peripheral surface from an opening of the casing. The developing device 40Y further includes a first carrying screw 43Y, a second carrying screw 44Y, a developing doctor 45Y, and a toner concentration sensor (hereinafter, "T sensor") 46Y.

A dual-component developer including a magnetic carrier and a negatively charged Y toner is contained in the casing. The dual-component developer is stirred and carried by the first carrying screw 43Y and the second carrying screw 44Y to be subject to triboelectrification and then is supported on the surface of the developing sleeve 42Y. The thickness of the developer layer is controlled by the developing doctor 45Y and the developer is carried to a developed area corresponding to the photoconductor 2Y. The Y toner is adhered on the electrostatic latent image of the photoconductor 2Y. Thus, the Y toner image is formed on the photoconductor 2Y. The dual-component developer in which the Y toner is consumed through the developing is returned into the casing along with rotation of the developing sleeve 42Y.

A partition wall 47Y is provided between the first carrying screw 43Y and the second carrying screw 44Y. The partition wall 47Y divides the casing into a first feeding portion that contains the developing sleeve 42Y and the first carrying screw 43Y, and a second feeding portion that contains the second carrying screw 44Y. The first carrying screw 43Y is rotated and driven by a driving unit (not shown) and carries the dual-component developer in the first feeding portion from this side in the direction perpendicular to the paper surface of this figure to that side to provide it to the developing sleeve 4Y. The dual-component developer that the first carrying screw 43Y carries to the vicinity of an end of the first feeding portion passes through an opening (not shown) mounted on the partition wall 47Y into the second feeding portion. The second carrying screw 44Y in the second feeding portion is rotated and driven by a driving unit (not shown) and carries the dual-component developer sent from the first feeding portion to the direction contrary to the first carrying screw 43Y. The dual-component developer carried to the vicinity of an end of the second feeding portion by the second carrying screw 44Y returns to the inside of the first feeding portion through the other opening (not shown) mounted on the partition wall 47Y.

The T sensor 46Y including a magnetic permeability sensor is mounted on the bottom wall near the center of the second feeding portion and outputs voltage having a value according to a magnetic permeability of the dual-component developer passing on the T sensor 46Y. The magnetic permeability of the dual-component developer shows a certain degree of correlation with a toner concentration. Hence, the T sensor 46Y outputs voltage having a value according to a Y toner concentration. The value of the output voltage is sent to a control unit (not shown). The control unit includes a random access memory (RAM) and stores Vtref for Y therein as a target value of the output voltage from the T sensor 46Y. In addition, the control unit also stores data of Vtref for M, Vtref for C, and Vtref for K as a target value of output voltage from the T sensor (not shown) mounted on the other developing devices. Vtref for Y is used to control driving a Y toner carrying device (not shown). More specifically, the control unit drives and controls the Y toner carrying device (not shown) to replenish the second feeding portion 49Y with the Y toner such that a value of output voltage from the T sensor 46Y is close to Vtref for Y. This replenishment makes the Y toner concentration of the dual-component developer in the developing device 40Y maintain within a prescribed range. The same toner replenishing control is performed in developing devices of the other process units.

The Y toner image formed on the photoconductor 2Y is transferred on a sheet of recording paper carried on a later-described paper carrying belt. A surface of the photoconductor 2Y after transferring the image from which the remaining toner is cleaned by the drum cleaning device 48Y is then diselectrified by a diselectrifying device (not shown). The surface is entirely charged by the charging device 30Y to be prepared for next image formation. The same processing is performed in the other process units. Each of the process units is removable from the printer and can be removed at the end of its service life.

In FIG. 1, the transfer unit 11 as transfer means includes an endless paper carrying belt 12, a driving roller 13, a stretching roller 14, and four transfer bias rollers 17Y, 17M, 17C, and 17K. The paper carrying belt 12 as an endless moving member is stretched under tension across the driving roller 13 and the stretching roller 14, while endlessly moving counterclockwise in FIG. 1 by the driving roller 13 rotated by a driving system (not shown).

Transfer bias from a power source (not shown) is applied to each of the four transfer bias rollers 17Y, 17M, 17C, and 17K. The paper carrying belt 12 is pressed from each of their rear sides toward photoconductors 2Y, 2M, 2C, and 2K to form a transfer nip, respectively. A transfer electric field is produced between the photoconductor and the transfer bias roller at each transfer nip by effects of the transfer bias. The Y toner image formed on the photoconductor 2Y is transferred to the sheet P of recording paper carried on the paper carrying belt 12 based on effects of the transfer electric field and nip pressure. On the Y toner image, M, C, and K toner images formed on the photoconductors 2M, 2C, and 2K are overlapped and transferred in turn. This overlapped transfer causes a full-color toner image combined with a white color of the paper to be formed on the sheet P of recording paper carried on the paper carrying belt 12 as a recording member.

The three paper feeding cassettes 20 that store a plurality of overlapped sheets P of recording paper are arranged in multiple stages downward of the transfer unit 11. A paper feeding roller is pressed on top of the sheets P in each of the cassettes. When the paper feeding roller is rotated and driven at a predetermined timing, the top of sheets P of recording paper is fed to a paper carrying path.

The sheet P carried to the paper carrying path from the paper feeding cassette 20 is caught between the resist roller pair 19. The resist roller pair 19 send out the sheet P caught between the rollers at a timing when a toner image can be overlapped with the sheet P at each transfer nip. Thus, the toner image is overlapped with and transferred to the sheet P of recording paper at each nip. The sheet P on which the full-color image is formed is sent to the fixing unit 21.

The fixing unit 21 includes a heating roller 21a that includes a heating source such as a halogen lamp therein and a pressure roller 21b that comes into pressed contact with the heating roller 21a both of which form a fixing nip. While the sheet P is caught into the fixing nip, the full-color image is fixed on the surface of the sheet P. The sheet P that passes through the fixing unit 21 is discharged through a pair of paper discharging rollers (not shown) outside the apparatus.

Figure 3A:
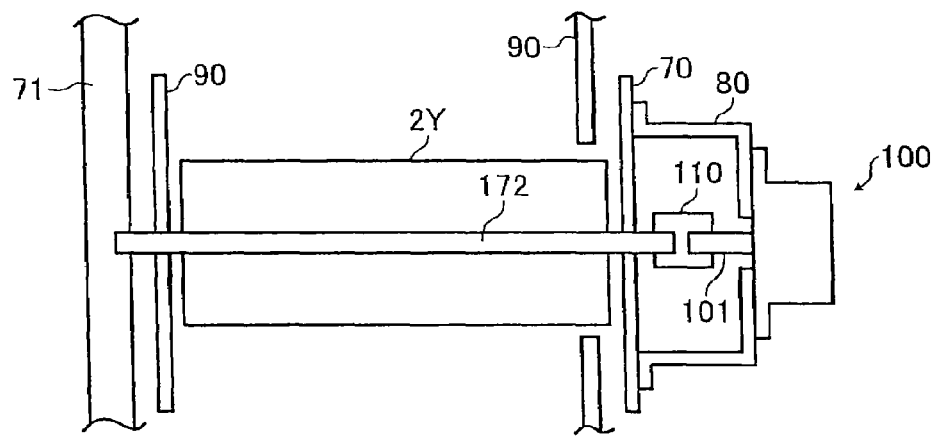
FIG. 3A is a vertical cross section of the Y process unit set in the printer and its surroundings.
Figure 3B:
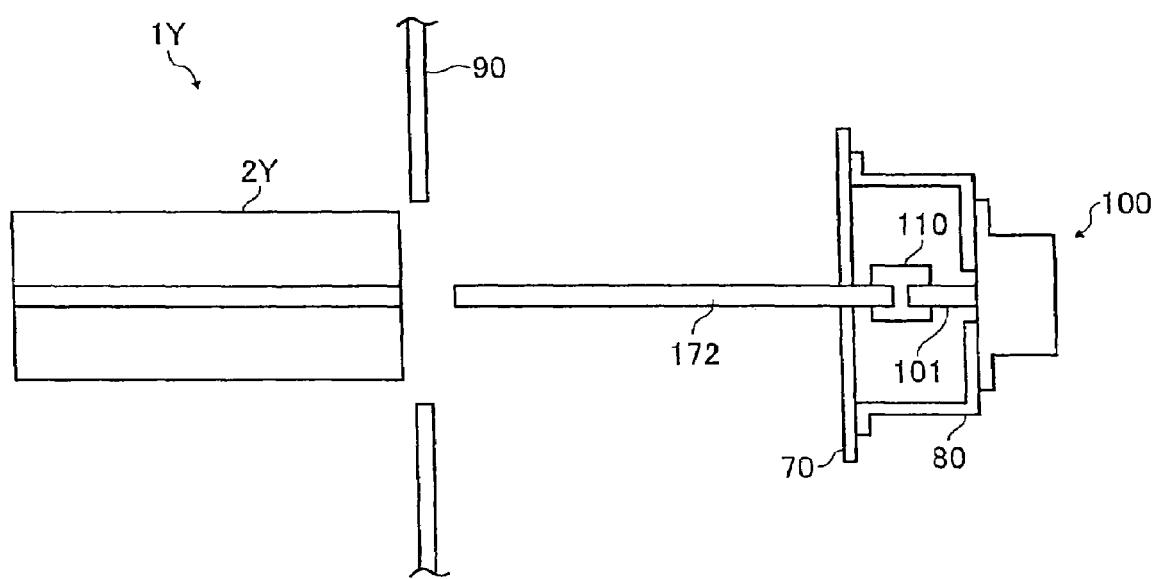
FIG. 3B is another vertical cross section of the Y process unit removed from the printer and its surroundings.

FIG. 3A is a vertical cross section of the process unit 1Y and its surrounding structure in the printer. FIG. 3B is a vertical cross section of the process unit 1Y removed from the printer and its surrounding structure. In the right and left directions of FIGS. 3A and 3B, the left side corresponds to a front side of the printer and the right side corresponds to a rear side of the printer. As shown in FIG. 3A, the process unit 1Y set in the printer is positioned between a surface board 71 arranged near a front end of the printer and a rear board 70 of the printer. As shown in FIG. 3B, a center hole is formed that extends through from one end side to the other end side of an axial direction at a circle center of the cylindrical photoconductor 2Y. A photoconductor shaft 172 as a connecting shaft is rotatably supported by a bearing (not shown) of the rear board 70. As shown in FIG. 3A, when the printer unit 1Y is set in the printer, the photoconductor shaft 172 supported at the rear board 70 is inserted into the center hole of the photoconductor 2Y. A lateral sectional shape of its center hole is non-circular, such as D-shaped or oval-shaped and a lateral sectional shape of the photoconductor shaft 172 is similar to that of the center hole of the photoconductor 2Y. Without idling the photoconductor shaft 172 inserted into the center hole, hence, a rotation driving force of the photoconductor shaft 172 is communicated to the photoconductor 2Y.

The photoconductor shaft 172 extends through the rear board 70 of the printer so that the rear end portion of the photoconductor shaft 172 is positioned further backward from the back side of the rear hoard 70. A driving motor 100 serving as a driving source is fixed through a bracket 80 to the rear board 70 of the printer on the opposite side of the surface board 71. The driving motor 100 is aligned with the photoconductor shaft 172 and a rotation driving force from the driving motor 100 is transmitted through a constant velocity joint 110 to the photoconductor shaft 172.

The driving motor 100 is a direct motor that transmits a rotation driving force to the photoconductor 2Y without using a gear. By connecting a driving force between a driving-side rotating member 101 as a driving shaft and the photoconductor shaft 172 without using a gear, it is possible to avoid velocity variation of the photoconductor due to decentering of a gear or uneven pitch of its tooth.

When the process unit 1Y is removed from the printer, the movable surface board 71 is moved from a position opposite to the rear board 70. Then, the process unit 1Y is pulled out from the rear side of the printer to its front side. The photoconductor 2Y is maintained to a frame member 90 of the process unit 1Y (not shown in FIG. 3B).

Next, characteristic configuration of the printer according to the embodiment is explained.

Figure 4:
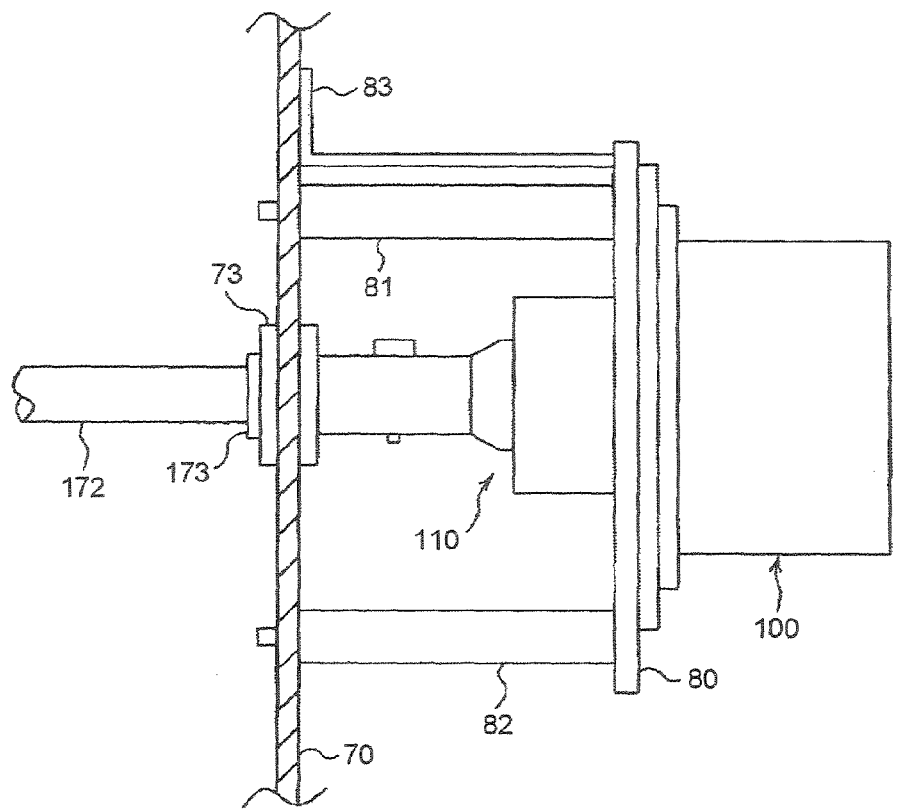
FIG. 4 is a side view of a constant velocity joint shown in FIGS. 3A and 3B and its surroundings.

FIG. 4 is a side view of the constant velocity joint 110 and its surrounding structure. In FIG. 4, the left side of the rear board 70 of the printer is a unit side in which a process unit (not shown) is accommodated and the right side is a drive transmission side in which the driving motor 100 and the like is accommodated. The bracket 80 is fixed on the surface of the drive transmission side of the rear board 70. The driving motor 100 is fixed to the rear surface of the bracket 80. The constant velocity joint 110 is contained inside the bracket 80. In FIG. 4, the rear board 70 of the printer is depicted as a section.

The bracket 80 is formed by bending molding of a sheet metal such as press working. The bracket 80 includes two positioning pins 81 and 82 that are each extended through positioning holes (not shown) of the rear board 70 to position the bracket 80 on the rear board 70. The bracket 80 also includes a fixing portion 83 to fasten the bracket to the rear board 70 by using screws. The fixing portion 83 includes screw holes (not shown) to fasten the bracket 80 to the rear board 70 by using screws.

Figure 5:
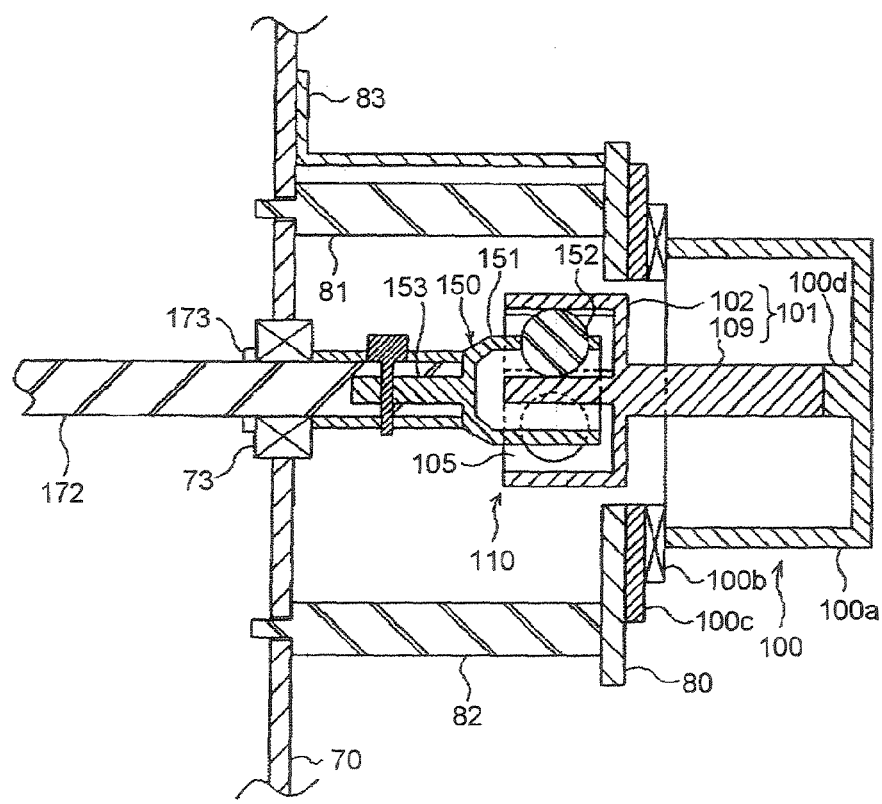
FIG. 5 is a cross section of the constant velocity joint and its surroundings.

The driving motor 100 fixed on the back surface of the bracket 80 is an out-rotor type of DC brushless motor. As shown in FIG. 5, the driving motor 100 includes a cylindrical rotor 100a, a bearing 100b, and a fixing board 100c. A cylindrical case exposed outside is rotated as the rotor 10a.

The photoconductor shaft 172 connected to the driven side of the constant velocity joint is pressed into a bearing 73 fixed on the rear board 70 of the printer and extends through the rear board 70. A fixing ring 173 having a larger diameter than that of the photoconductor shaft 172 is fitted on the photoconductor shaft 172 at a predetermined position in its axial direction. The fixing ring 173 contacts the side surface of the bearing 73 on the unit side so that the photoconductor shaft 172 is positioned in the axial direction with respect to the printer.

The constant velocity joint 110 connects the driving motor 100 to the photoconductor shaft 172 inside the bracket 80 both of which are aligned each other in the axial direction. As described above, the bracket 80 is formed by bending processing of a sheet metal, it is difficult to accurately position the driving motor 100 with respect to the rear board 70 because, when processing, variation is likely to occur in an angle to bent. Accordingly, the driving motor 100 is easy to incline with respect to the photoconductor shaft 172. In the printer, if the driving motor 100 happens to be skew like this, connection between the driving motor 100 and the photoconductor shaft 172 by use of the constant velocity joint 110 makes it possible to communicate a rotation driving force at constant velocity from the driving-side rotating member 101 as a driving shaft to the photoconductor shaft 172.

The constant velocity joint 110 includes a female-side joint and a male-side joint that engage with each other in the axial direction. The female-side joint is located on the driving side as the driving-side rotating member 101 in the example of FIG. 5; however, either of them can be located on the driving side. The driving-side rotating member 101 functions not only as a driving side of the constant velocity joint 110 but also as a driving shaft of the driving motor 100.

More specifically, the driving-side rotating member 101 as a female-side joint includes a cup 102 that fits over a driven-side rotating member 150 as a male-side joint and a driving shaft portion 109 that is located closer to the driving side than the cup. The cup 102 has an opening on the driven side of the axial direction from which the driven-side rotating member 150 is inserted into the cup. The driving shaft portion 109 protrudes from an end surface of the cup 102 on the driving side and extends on the center axis line of the driving motor 100. The cup 102 and the driving shaft portion 109 are integrally formed (integrally molded) of the same material. The driving shaft portion 109 comes into press fit or into press contact with a shaft protrusion 100d that protrudes from the center of the circular bottom surface in the rotor 100a of the driving motor 100. Thus, the driving shaft portion 109 of the driving-side rotating member 101 is removably connected to the rotor 100a and functions as a driving shaft of the driving motor 100. Instead of the female-side joint, the male-side joint may be located on the driving side and function as the driving shaft of the driving motor 100.

A stator, magnet, coil and the like (not shown) that are well known are arranged in the driving motor 100 to rotate and drive the rotor 100a. The rotor 100a is rotatably supported at the columnar bearing 100b and rotates with the driving-side rotating member 101 through a magnetic force generated between the stator and the rotor.

The driving shaft portion 109 of the driving-side rotating member 101 serving as the driving shaft of the driving motor 100 protrudes from inside of the rotor 100a to outside. More specifically, the driving shaft portion 109 is through a center hole of the columnar bearing 100b of the driving motor 100 and a center hole of a fixing board and extends outside of the driving motor 100. The driving shaft portion 109 is coupled to the cylindrical cup 102 outside of the driving motor 100.

Figure 6:
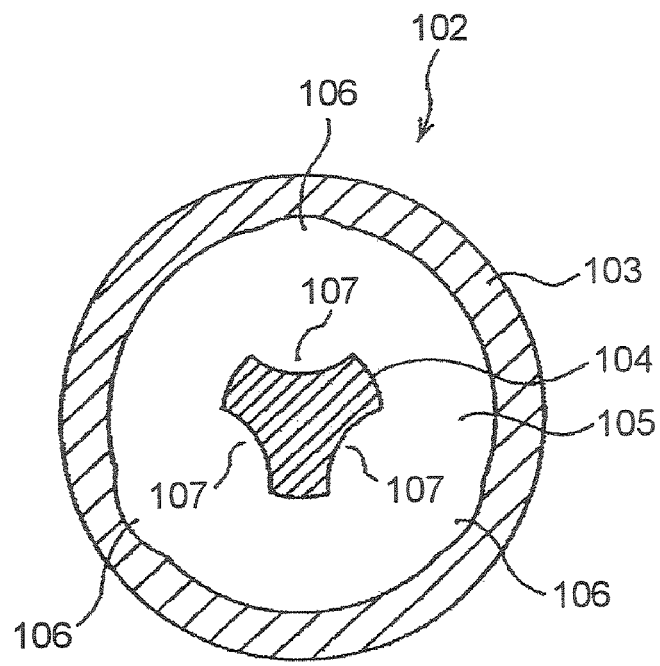
FIG. 6 is a lateral cross section of a cup of a driving-side rotating member shown in FIG. 5.

The cup 102, as shown in FIG. 6, includes an outer ring 103, an inner ring 104 inside the outer ring, a cylindrical space 105 as a gap between the outer ring and the inner ring, three outer grooves 106 mounted on an inner peripheral surface of the outer ring 103, and three inner grooves 107 mounted on an outer peripheral surface of the inner ring 104. As shown in FIG. 5, one end side of the axial direction of the cylindrical space 105 is open and the other end side is closed. The driven-side rotating member 150 is inserted from the open end side of the cup.

As shown in FIG. 6, the three outer grooves 106 on the inner peripheral surface of the outer ring 103 extend in the axial direction of the outer ring 103 in alignment in a circular direction with a phase difference of 120 degrees therebetween. The three inner grooves 107 on the outer peripheral surface of the inner ring 104 are also extend in the axial direction of the inner ring 104 in alignment in the circular direction with a phase difference of 120 degrees therebetween. The outer grooves 106 and the inner grooves 107 face each other via the cylindrical space 105.

Figure 7:
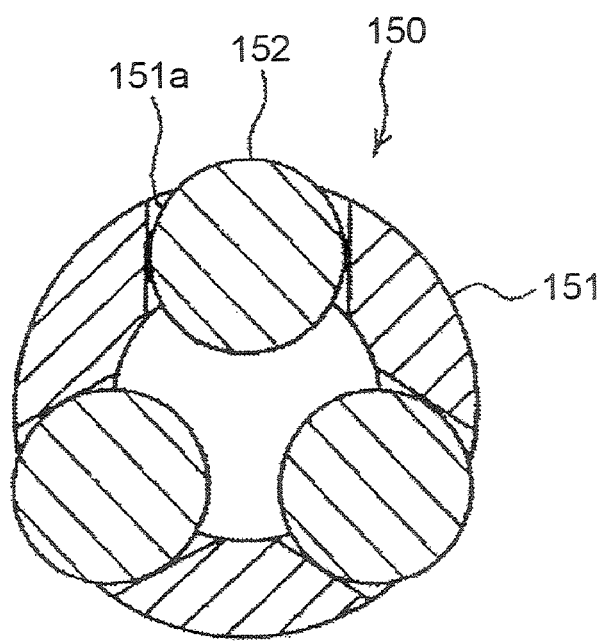
FIG. 7 is a lateral cross section of a ball holding member of a driven-side rotating member shown in FIG. 5.

The driven-side rotating member 150 as a male-side joint shown in FIG. 5 has a cylindrical ball holding member 151 engaged into the cup 102 of the driving-side rotating member 101 and a shaft portion 153 that protrudes from a driven-side end surface of the driven-side rotating member 150 and extends on the rotation shaft line. The ball holding member 151 includes three through-holes 151a in its cylindrical peripheral wall that align in the peripheral direction with a phase difference of 120 degrees therebetween as shown in lateral cross section of FIG. 7. A ball 152 as a sphere is rotatably held in each of the through-holes 151a. The ball holding member 151 and the shaft portion 153 are integrally formed of the same material.

Figure 8:
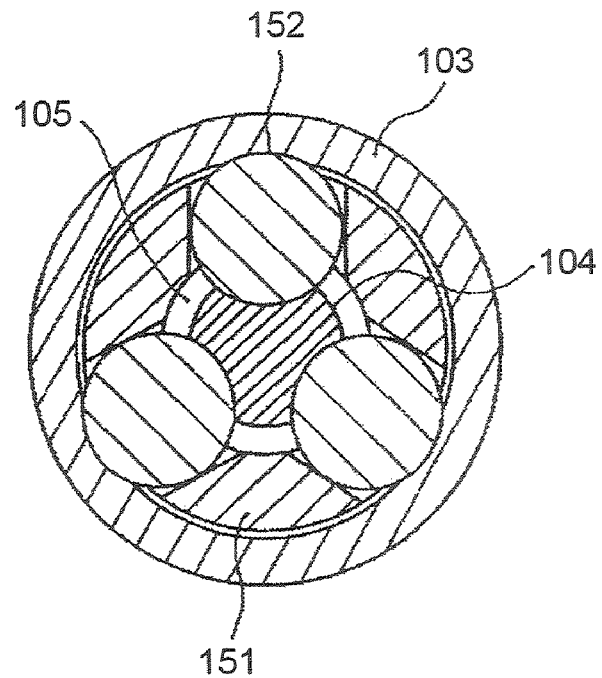
FIG. 8 is a lateral cross section of the cup and the ball holding member engaged in a cylindrical space thereof.

As shown in FIG. 5 above, the cylindrical ball holding member 151 of the driven-side rotating member 150 is inserted in the cylindrical space 105 of the cup 102 of the driving-side rotating member 101. Under this condition, as shown in FIG. 8, the three balls 152 held in the ball holding member 151 of the driven-side rotating member are caught between the outer grooves on the inner peripheral surface of the outer ring 103 of and the inner grooves on the outer peripheral surface of the inner ring 104 of the driving-side rotating member respectively and their operations are prevented in the normal direction. Note that the outer grooves and the inner grooves extend in the axial direction respectively and an operation of the ball 152 in the axial direction is allowed.

As shown in FIG. 5, the cylindrical ball holding member 151 of the driven-side rotating member 150 is inserted in the cylindrical space 105 of the cup 102 of the driving-side rotating member 101, and each of the three balls 152 held by the ball holding member 151 is engaged between the outer groove and the inner groove of the cylindrical space 105 shown in FIG. 8. When the driving-side rotating member 101 is rotated by driving of the driving motor 100, the rotation driving force is transmitted to the driven-side rotating member 150 at constant velocity through the three balls 152. Then, the rotation driving force is transmitted through the photoconductor shaft 172 to the photoconductor (not shown).

In the above configuration, it is unnecessary to connect the driving-side rotating member 101 and the driving shaft of the driving motor 100 because the driving shaft portion 109 of the driving-side rotating member 101 is functioned as the driving shaft of the driving motor 100. As a result, it is possible to avoid shaft misalignment in a connected portion between the driving-side rotating member 101 and the driving shaft of the driving motor 100 and velocity variation of the photoconductor due to shaft misalignment.

The cup 102 provided with the grooves to engage the balls 152 in both the inner peripheral surface of the outer ring 103 and the outer peripheral surface of the inner ring 104 respectively is explained, however, a groove may be formed only at either of the grooves.

It is desirable to form the driving-side rotating member 101 and the driven-side rotating member 150 with a resin material that can be injection-molded. If injection-molding is acceptable, either thermoplastic resin or thermosetting resin can be used. Synthetic resin that can be injection-molded includes crystalline resin and amorphous resin. Though either resin can be used, it is preferable to use crystalline resin because amorphous resin has low tenacity and is abruptly broken when torque equal to or more than an allowed amount is produced. Furthermore, it is desirable to use resin with relatively high lubrication. Examples of such synthetic resin include poly oxy methylene (POM), nylon, fluoropolymer resin that can be injection-molded (e.g., perfluoroalkoxy copolymer (PFA), tetrafluoroethylene-hexafluoropropylene copolymer (FEP), ethylene-tetrafluoroethylene (ETFE)), polyimide that can be injection-molded, polyphenylene sulfide (PPS), wholly aromatic polyester, polyether ether ketone (PEEK), and polyamide imide. These synthetic resins can be used either singly or in mixtures of two or more as a polymer alloy. Even another synthetic resin with relatively low lubrication quality can be used if the synthetic resin is mixed with the aforementioned one to be a polymer alloy.

The most suitable synthetic resin for the driving-side rotating member 101 and the driven-side rotating member 150 is POM, nylon, PPS, and PEEK. Nylon, nylon 6, nylon 66, nylon610, nylon 612, nylon 11, nylon 12, and nylon 46, is semi-aromatic nylon, etc. having an aromatic ring in the molecular chain. Among them, POM, nylon, and PPS have high heat resistance and lubricity, and are relatively inexpensive. Therefore, these synthetic resins can realize the constant velocity joint 110 that is excellent in cost performance. PEEK is good in mechanical strength and in lubricity, hence serving as synthetic resin of realizing the multifunctional constant velocity joint without mixing a reinforcing agent or a lubricant.

In the constant velocity joint 110 having such a configuration, the two rotating members are formed of resin materials respectively. Therefore, the joint can be reduced in weight, compared with its conventional configuration in which the joint is formed of metal materials. In addition, the inner peripheral surface of the outer ring 103 and the outer peripheral surface of the inner ring 104 are made of resin materials. Accordingly, the driving-side rotating member 101 and the driven-side rotating member 150 can be rotated smoothly without filling grease in the cylindrical space 105, while the operation noise can be reduced, compared with that in the conventional configuration in which the rotating members are formed of metal materials. As a result, the constant velocity joint 110 of the printer can be reduced in weight, the operation noise can be reduced when transmitting torque, and it is unnecessary to fill grease. Thus, the printer is not subject to limitations of noise or grease pollution and can be applied to an office machine, an audio equipment, a medical equipment, an electric home appliance, and a food manufacturing equipment to which the printer is difficult to be applied.

It is possible to add a solid lubricant or lubricating oil to a resin material that constitutes the driving-side rotating member 101 and the driven-side rotating member 150 to increase lubrication. Examples of the solid lubricant include polytetrafluoroethylene (PTEF), graphite, and molybdenum disulfide. Glass fiber, carbon fiber, or various mineral fiber (whisker) can be mixed with a resin material to increase strength, or can also be used together with a solid lubricant.

Bearing steel ball, stainless steel ball, ceramics ball, ball made of synthetic resin can be used as the ball 152. Stainless steel ball of all is suitable because it is not subject to rusting and inexpensive.

The constant velocity joint 110 to communicate a rotation driving force to the photoconductor for Y is explained. The rotation driving force is also communicated to a photoconductor for M, C, and K by the same constant velocity joint and driving motor.

Figure 9:
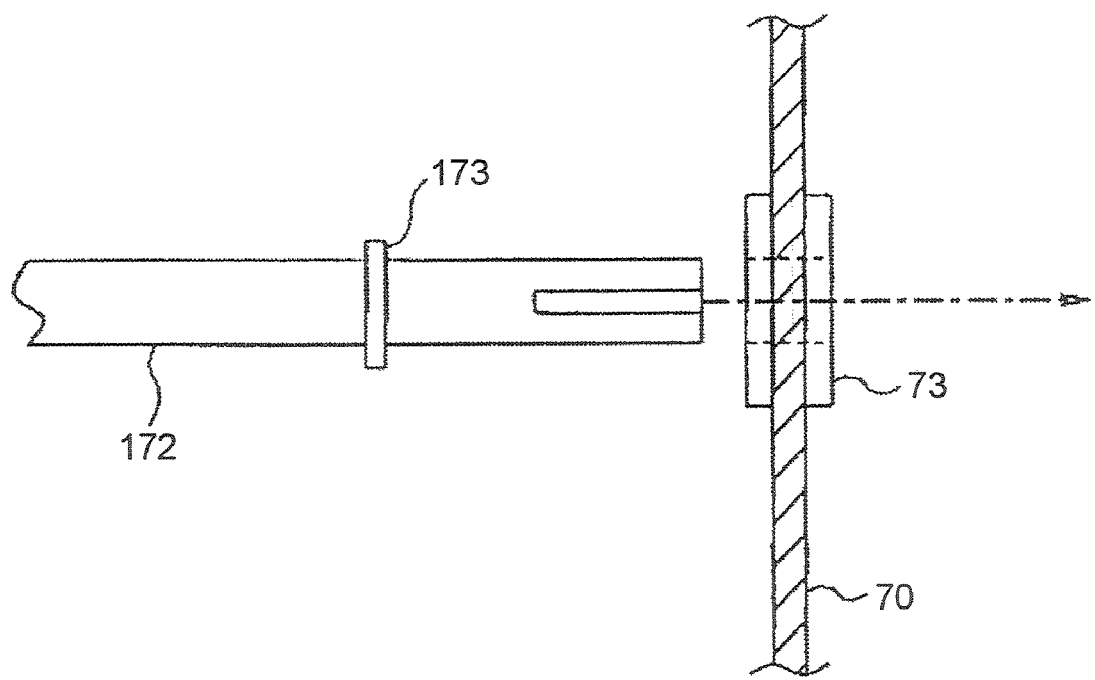
FIG. 9 is a side view of a photoconductor shaft that is to be pressed into a bearing fixed on a rear board of the printer.
Figure 10:
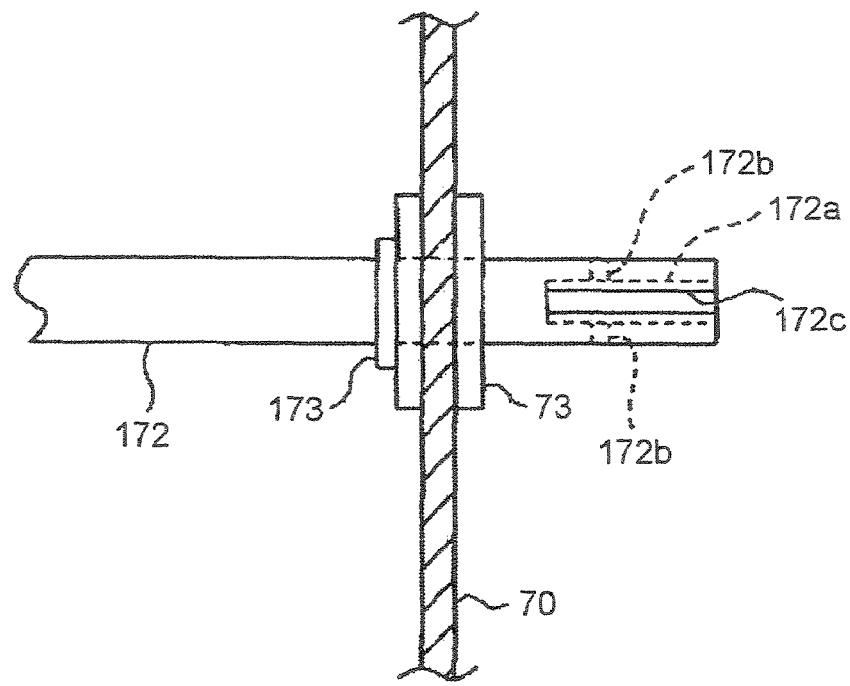
FIG. 10 is a side view of the photoconductor shaft positioned in an axial direction.

When assembling a driving system associated with a process unit in the printer, as shown in FIG. 9, the photoconductor shaft 172 is pressed into the hearing 73 fixed to the rear board 70 of the printer from a process unit side (not shown). As shown in FIG. 10, the fixing ring 173 fixed around the photoconductor shaft 172 contacts an end surface of a driven side of the bearing 73 so that the photoconductor shaft 172 is positioned with respect to the printer in the axial direction.

A shaft hole 172a that extends in the axial direction and is open toward the driving side is provided at an end of the driving side of the photoconductor shaft 172. A through-hole 172b is also provided that penetrates in the direction perpendicular to the axial direction and crosses the shaft hole 172a. Additionally, two slits 172c are provided that are faced each other and extend in the axial direction to divide the shaft hole 172a into two. FIG. 10 depicts only one of the slits 172c; however, the two slits 172c actually face each other in the direction perpendicular to the paper surface of FIG. 10.

Figure 11:
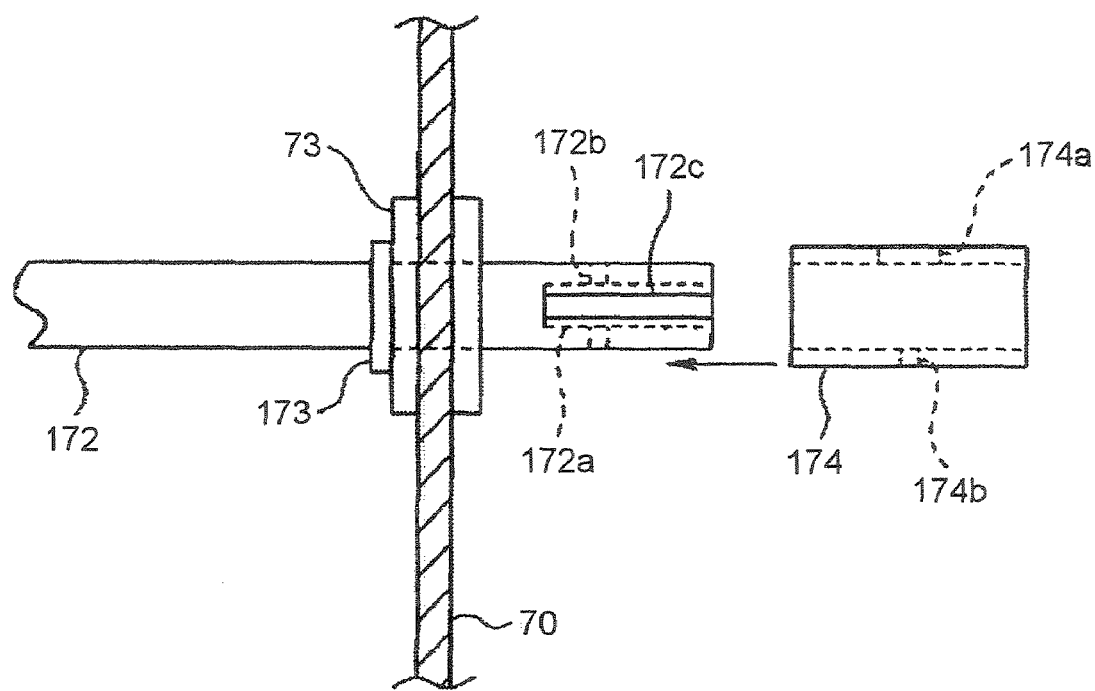
FIG. 11 is a side view of the photoconductor shaft and a retaining member into which the photoconductor shaft is to be inserted.

After positioning the photoconductor shaft 172, as shown in FIG. 11, a retaining member 174 that is made of metal and whose inner diameter is slightly larger than an outer diameter of the photoconductor shaft 172 is fitted over the outer peripheral surface of the photoconductor shaft 172 at the driving-side end. The cylindrical retaining member 174 includes a through opening 174a in its outer peripheral surface at a predetermined position and a screw hole 174b provided at a position corresponding to the through opening 174a. When the retaining member 174 is fitted over the outer peripheral surface of the photoconductor shaft 172 at the driving-side end, the retaining member 174 is freely turned on the shaft to make the through opening 174a of the retaining member 174, the through-hole 172b of the photoconductor shaft 172, and the screw hole 174b of the retaining member 174 arranged on a substantially straight line.

Figure 12:
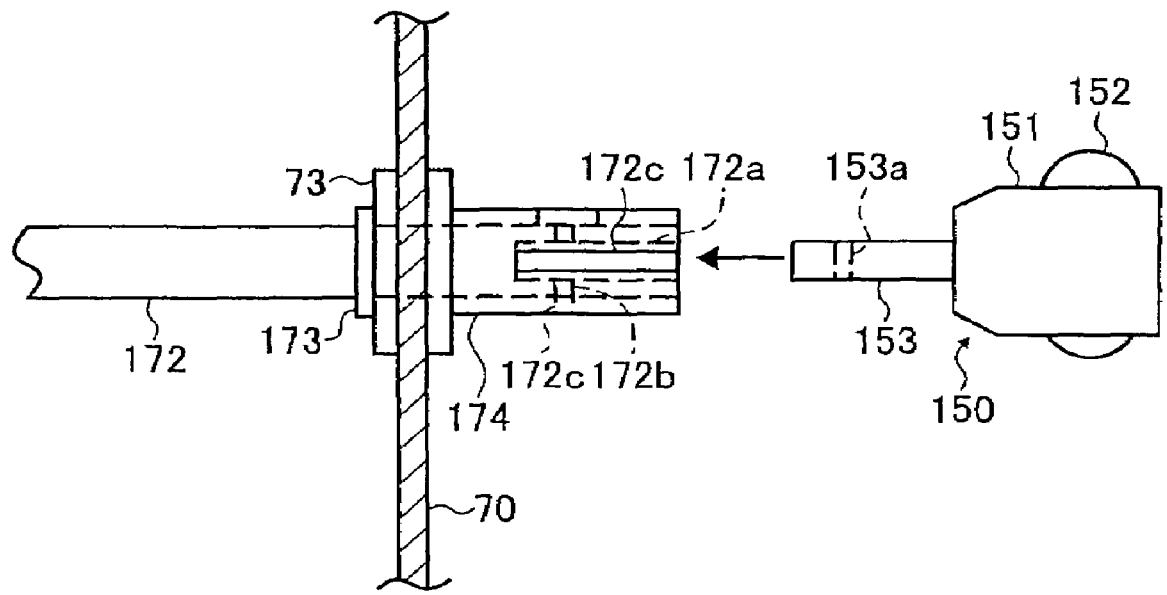
FIG. 12 is a side view of the photoconductor shaft, the retaining member, and the driven-side rotating member to be inserted into a shaft hole of the photoconductor shaft.
Figure 13:
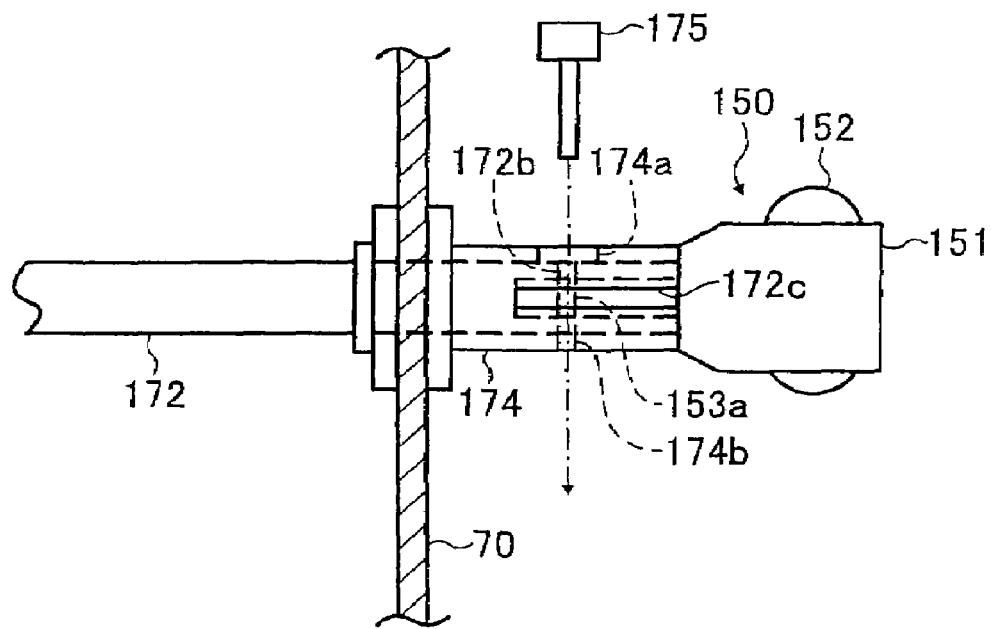
FIG. 13 is a side view of the photoconduCtor shaft, the retaining member and the driven-side rotating member, into which a male-screw member is to be inserted.

As shown in FIG. 12, the shaft portion 153 that is the driven-side end of the driven-side rotating member 150 of the constant velocity joint 110 is inserted into the shaft hole 172a of the photoconductor shaft 172. A through-hole 153a that is perpendicular to the axial direction is formed at the shaft portion 153 of the driven-side rotating member 150. When the shaft portion 153 is inserted into the shaft hole 172a of the photoconductor shaft 172, the shaft portion 153 is freely turned in the shaft hole 172a to make the through-hole 153a and the through-hole 172b of the photoconductor shaft 172 arranged on a substantially straight line. Under this condition, as shown in FIG. 13, a male-screw member 175 passes through the through opening 174a of the retaining member 174, the through-hole 172b of the photoconductor shaft 172, and the through-hole 153a of the shaft portion 153 in turn and then is screwed in the screw hole 174b of the retaining member 174. Then, along with the screwing, the photoconductor shaft 172 is transformed from both sides in the direction perpendicular to the axial direction toward the slits 172c and firmly catches the shaft portion 153 in the shaft hole 172a. This makes it possible to prevent the shaft hole 172a and the shaft portion 153 from rattling and to avoid shaft misalignment between them. Therefore, color deviation in an image or deviation between overlapped images can be suppressed due to velocity variation of the photoconductor caused by decentering of the photoconductor shaft 172 and the shaft portion 153.

When the diameter of the shaft hole 172a is equal to or smaller than that of the shaft portion 153 and the shaft portion 153 is pressed into the shaft hole 172a, it is possible to avoid making rattles between the shaft hole 172a and the shaft portion 153. Under such a configuration, however, rot that makes it difficult for the shaft portion to be pressed into the shaft hole is produced due to difference in size or in shape of the shaft hole 172a and the shaft portion 153, leading to high cost because of a reduction in productivity. On the contrary, as shown in the example of FIGS. 12 and 13, a configuration that the photoconductor shaft 172 is divided into two by the slits 172c and the screwing of the male-screw member 175 makes sites divided into two transform in the axial direction respectively allows slight clearance to be provided between the shaft hole 172a and the shaft portion 153. Thus, it is possible to avid the aforementioned reduction in productivity.

Figure 14:
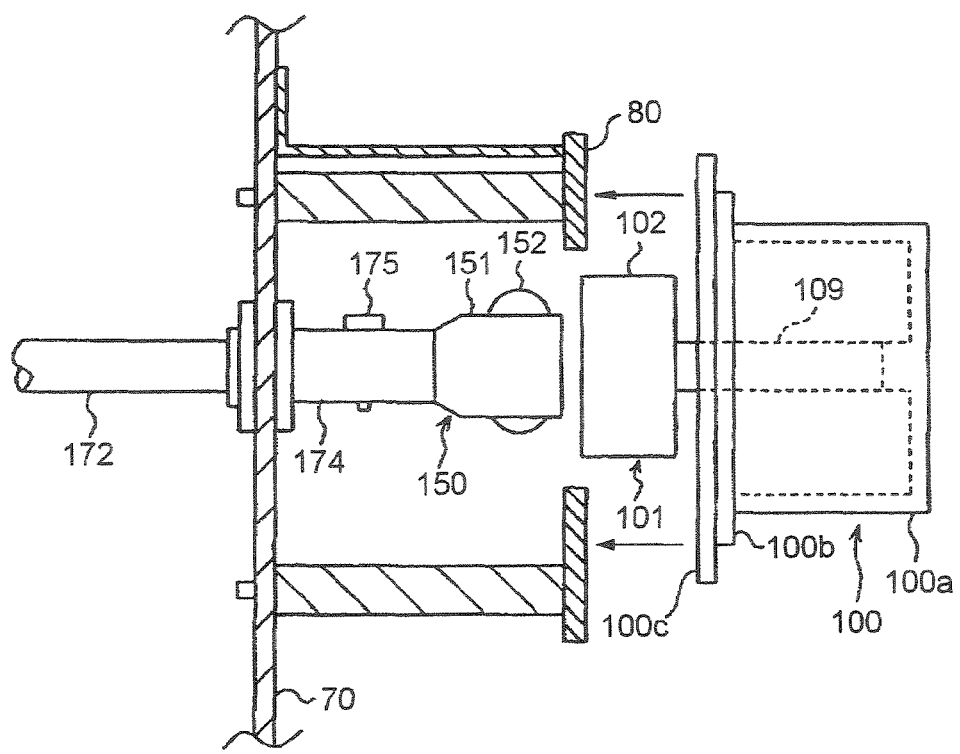
FIG. 14 is a side view of a driving motor to be fixed to a bracket while the ball holding member is engaged into the cup.

As described above, the driven-side rotating member 150 is set and then, as shown in FIG. 14, the cup 102 of the driving-side rotating member 101 connected to the driving motor 100 is fitted over the ball holding member 151 of the driven-side rotating member 150 and the driving motor 100 is screw-fitted to the bracket 80.

Figure 15:
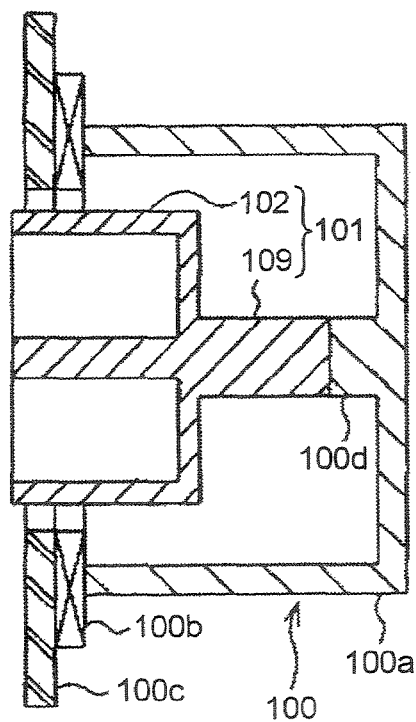
FIG. 15 is a cross section of a modified example of the driving motor.

An example of the driving motor 100 in which the cup 102 of the driving-side rotating member 101 is provided outside of the rotor 100a is explained; however, as shown in FIG. 15, the cup 102 can be provided inside of the rotor 100a.

A drive transmitting device for the process unit in the printer according to the embodiment includes the driving motor 100, the constant velocity joint 110, the rear board 70, the bearing 73, the retaining member 174, the fixing ring 173, the photoconductor shaft 172 that are explained so far.

Next, characteristic features of a printer according to a first embodiment are explained.

In FIG. 14, when the driving motor 100 is mounted on the bracket 80, it is difficult to visually recognize whether the cup 102 of the driving-side rotating member 101 can be securely fitted over the ball holding member 151 of the driven-side rotating member 150 set to the printer side.

Figure 16:
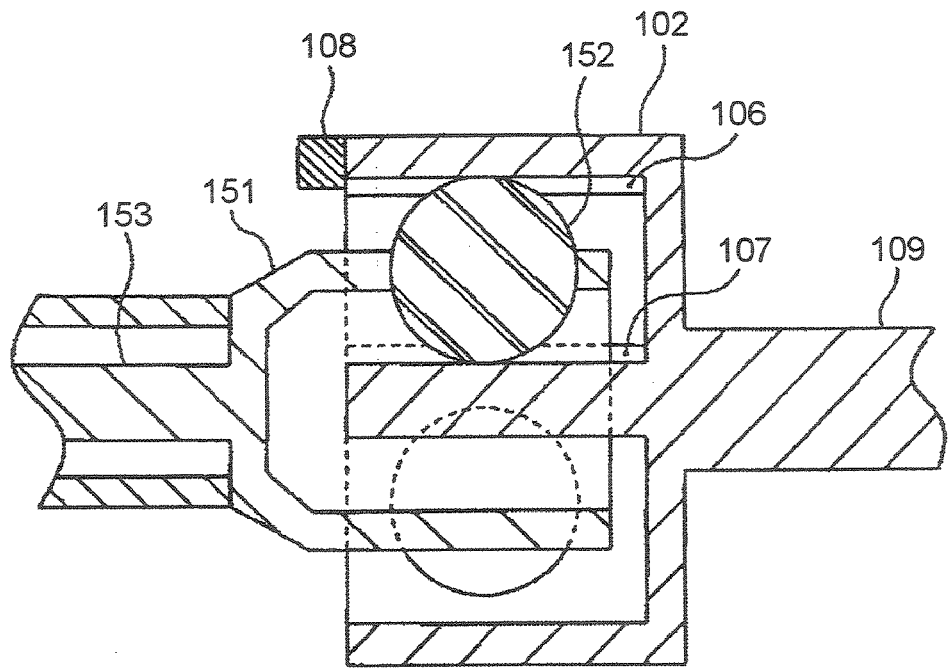
FIG. 16 is an enlarged cross section of an engaged portion of the constant velocity joint of a printer according to a first embodiment of the present invention.

Therefore, in the printer according to the first embodiment, as shown in FIG. 16, a protrusion 108 that is made of a material that can be transformed to a certain degree such as resin or rubber is provided at a position on the driven-side end surface of the cup 102 and is on an extended line of the outer groove 106. The protrusion 108 protrudes from a bottom surface of the outer groove 106 to the height direction of the groove at an end of the driven side in the axial direction of the outer groove 106.

Under this configuration, when the cup 102 is fitted over the ball holding member 151, in more detail, when the ball 152 held in the ball holding member 151 is engaged in between the outer groove 106 and the inner groove 107 of the cup 102, the ball 152 contacts a side surface of the protrusion 108. Then, when the ball 152 is made to get over the protrusion 108, while subtly transforming the protrusion 108, an operator receives a sense of click and can recognize secure engagement between the cup 102 and the ball holding member 151.

The protrusion 108 can be provided to correspond to all of the outer grooves 106 or to correspond to any one of the outer grooves 106. In addition, the protrusion can be provided to correspond to the inner groove 107 instead of the outer groove. In this case, the protrusion 108 can have a larger angle for managing engagement than when corresponding to the outer grooves 106. The protrusion 108 can also be provided at a bottom surface of the outer groove 106 or the inner groove 107.

Figure 17:
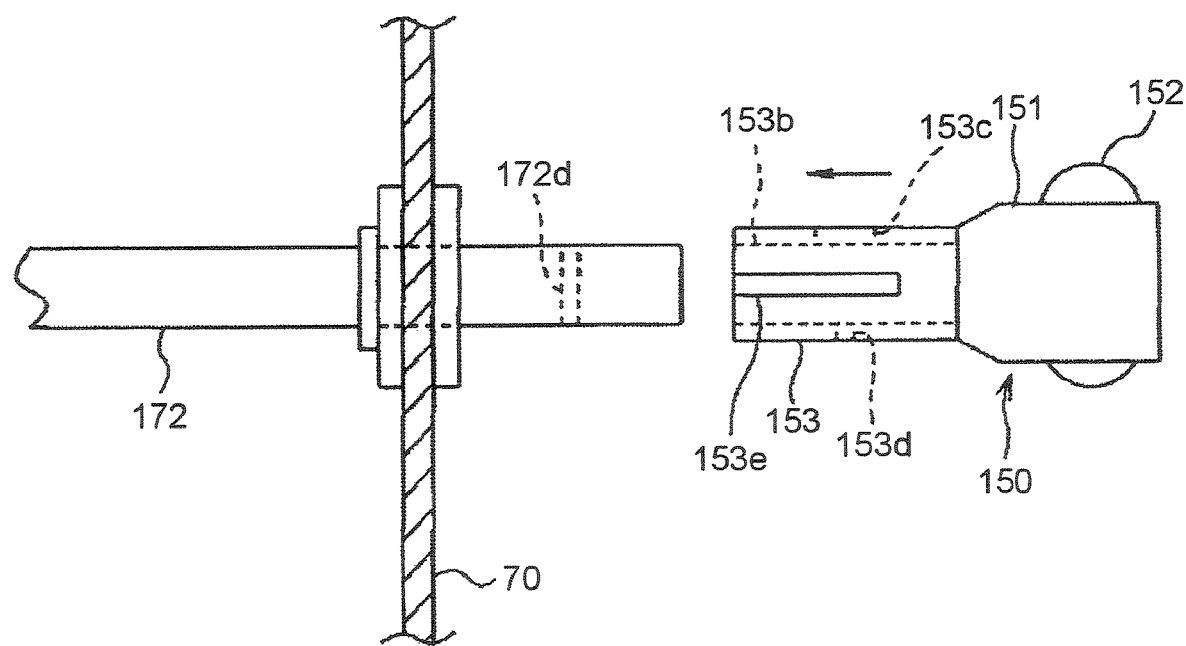
FIG. 17 is a side view of the photoconductor shaft and the driven-side rotating member, into which the photoconductor shaft is to be inserted, of a printer according to a second embodiment of the present invention.

In the printer according to a second embodiment, unlike the configuration shown in FIG. 12, the concavo-convex relation of the driving-side end of the photoconductor shaft 172 and the driven-side end of the driven-side rotating member 150 is reversed. More specifically, as shown FIG. 17, the shaft portion 153 of the driven-side rotating member 150 has a larger diameter than that of the photoconductor shaft 172. The driving-side end of the photoconductor shaft 172 is inserted into a shaft hole 153b extending in the axial direction while the driven-side end face of the shaft portion 153 is open. The shaft portion 153 includes a through-hole 153c that penetrates in the direction perpendicular to the axial direction and crosses the shaft hole 153b, a screw hole 153d corresponding to the through-hole 153c, and two slits 153e that face each other and extend in the axial direction to divide the shaft hole 153b into two.

Figure 18:
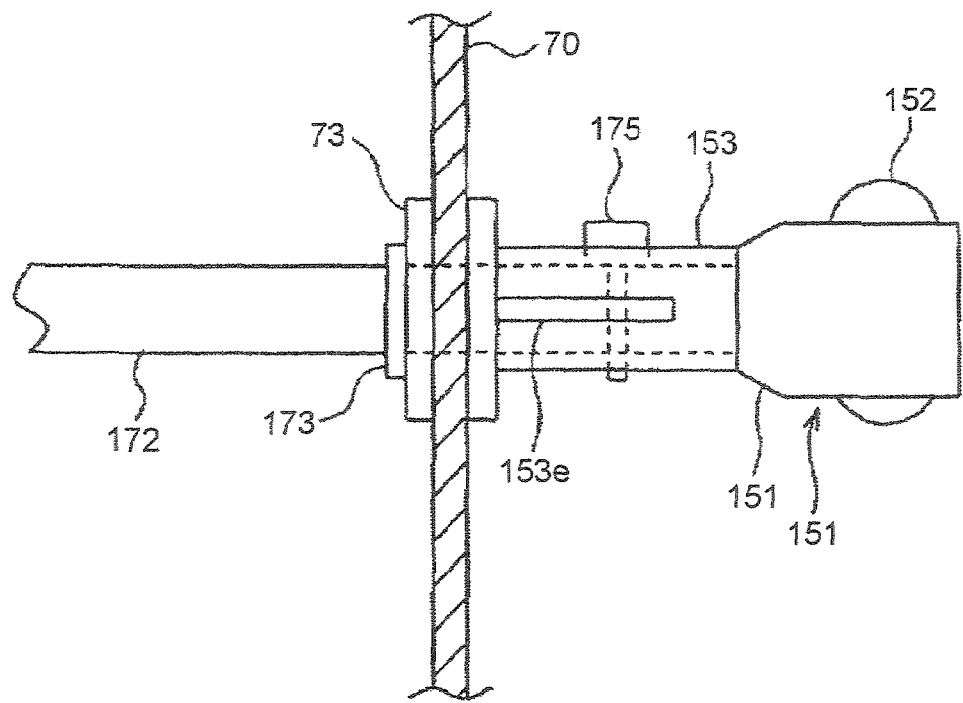
FIG. 18 is a side view of the photoconductor shaft inserted into the driven-side rotating member.

On the other hand, a shaft hole extending in the axial direction is not formed at the driving-side end of the photoconductor shaft 172. A through-hole 172d is instead formed that penetrates in the direction perpendicular to the axial direction. When the photoconductor shaft 172 is inserted into the shaft hole 153b of the shaft portion 153 of the driven-side rotating member 150, the through-hole 17d of the photoconductor shaft 172 is opposed to the through-hole 153c or the screw hole 153d of the shaft portion 153. Thus, while the through-hole 17d of the photoconductor shaft 172, the through-hole 153c and the screw hole 153d of the shaft portion 153 are aligned in a substantially straight line, as shown in FIG. 18, the male-screw member 175 passes through those holes and is screwed therein. Under this configuration, similar to the printer according to the embodiment, along with the screwing of the male-screw member 175, the shaft portion 153 is transformed from both sides in the direction perpendicular to the axial direction to the slits 153e and firmly catches the photoconductor shaft 172. This makes it possible to prevent the shaft hole of the shaft portion 153 and the photoconductor shaft 172 from rattling and to avoid shaft misalignment between both of them. Therefore, color deviation in an image or deviation between overlapped images due to velocity variation of the photoconductor caused by decentering between the photoconductor shaft 172 and the shaft portion 153 can be suppressed.

In the printer according to the second embodiment, a length in the axial direction of the shaft portion 153 of the driven-side rotating member 150 is set to the same as the length of the protruded photoconductor shaft 172 from the driving-side end surface of the bearing 73. Accordingly, as shown in FIG. 18, the driving-side end of the photoconductor shaft 172 is inserted into the shaft hole of the shaft portion 153 of the driven-side rotating member 150 while the driven-side end surface of the shaft portion 153 contacts the driving-side end surface of the bearing 73. Under this configuration, the driven-side end surface of the shaft portion 153 contacts the driving-side end surface of the bearing 73. Thus, it is possible to prevent the shaft portion from escaping from the bearing 73 of the photoconductor shaft 172 without using a dedicated member.

In FIG. 14, when the driving motor 100 is fixed to the bracket 80, the ball 152 held in the ball holding member 151 cannot be inserted between the outer groove 106 and the inner groove 107 of the cup 102 based on a rotation angle relation between the ball holding member 151 and the cup 102, causing efforts to assemble again.

Figure 19:
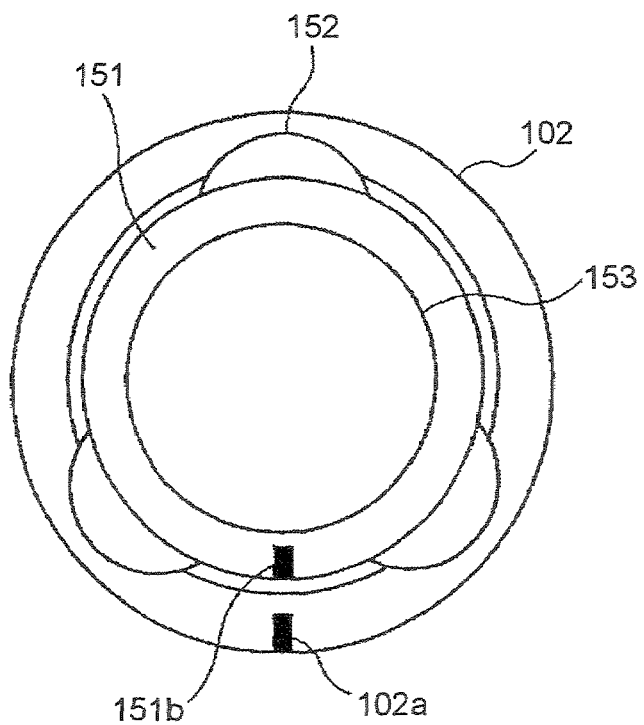
FIG. 19 is an enlarged elevation view of the constant velocity joint viewed from the driven side of a printer according to a third embodiment of the present invention.

Therefore, in the printer according to a third embodiment, as shown in FIG. 19, a mark 102a is provided at a predetermined position of the rotating direction in the driven-side end surface of the cup 102. A mark 151b is also provided at a predetermined position of the rotating direction in a tapered outer peripheral surface of the ball holding member 151. As shown in FIG. 19, the cup 102 and the ball holding member 151 are engaged each other to make each of the marks at the same rotation angle position, enabling easy engagement of the cup 102 and the ball holding member 151.

Hitherto, an example in which the constant velocity joint 110 is located in the drive transmitting mechanism that transmits a driving force to the photoconductor is explained. However, the constant velocity joint 110 can be provided in another drive transmitting mechanism. For example, the constant velocity joint 110 can be provided in a drive transmitting mechanism that transmits a driving force to a developing sleeve as a developing member. As another example, the constant velocity joint 110 can be provided in a drive transmitting mechanism that transmits a driving force to driving rollers that drive an intermediate transfer belt as an endless moving member while stretching the intermediate transfer belt. In this case, a combination of process units of each color, the optical writing unit 10, and the transfer unit 11 function as visible image forming means that forms a toner image as a visible image on the intermediate transfer belt as an image carrying member. In an embodiment, there is visible image forming means that does not include the transfer unit 11. More specifically, a combination of process units of each color and the optical writing unit 10 function as visible image forming means that forms a toner image as a visible image on the photoconductor as an image carrying member.

As described above, the printer according to the embodiments includes, of the driving-side rotating member 101 and the driven-side rotating member 150, the driving-side rotating member 101 that includes the outer ring 103, the inner ring 104 arranged inside the outer ring 103, the cylindrical space 105 between the outer and inner rings 103 and 104. The driving-side rotating member 101 further includes the three outer grooves 106 and the inner grooves 107 that extend in the axial direction of the cylindrical space 105 in alignment in the circular direction on the inner peripheral surface of the outer ring 103 and on the outer peripheral surface of the inner ring 104. The printer also includes the driven-side rotating member 150 that includes the ball holding member 151 to hold the balls 152 in each of the through-holes 151a that align in the peripheral direction on the cylindrical peripheral wall. The ball holding member 151 is inserted into the cylindrical space 105 and the three balls 152 held in the ball holding member 151 are engaged in three groove pairs (a pair of the outer groove 106 and the inner groove 107) in the cylindrical space 105. Thus, a rotation driving force is communicated between both of the rotating members through the three balls 152. Under this configuration, a rotation driving force can be communicated by a sliding-system constant velocity joint.

In the printer according to the first embodiment, the protrusion 108 that protrudes in the direction of the height of the groove from the bottom surface at an end in the axial direction of the outer groove 106 is provided corresponding to at least any one of three outer grooves 106. Under this configuration, as described before, when the cup 102 is fitted over the ball holding member 151, an operator receives a sense of click and can recognize secure engagement between the cup 102 and the ball holding member 151.

In the printer according to the first embodiment and each modified example, the photoconductor shaft 172 as a driven and rotated connecting shaft that is connected to the shaft portion 153 that is the driven-side end of the driven-side rotating member 150 is mounted, therefore, the photoconductor further on the driven side than the photoconductor shaft 172 and the driven-side rotating member 150 can be rotated at constant velocity.

The printer according to the second embodiment includes the driven-side rotating member 150 in which the through-hole 153a that penetrates in the direction perpendicular to the axial direction is provided at the shaft portion 153 as a driven-side end as well as the photoconductor shaft 172 that includes the shaft hole 172a into which the shaft portion 153 is inserted in the axial direction, the through-hole 172b that penetrates in the direction perpendicular to the axial direction and that crosses the shaft hole 172a, and the two slits 172c opposed to each other that extend in the axial direction and that divides the shaft hole 172a into two. Under the condition where the shaft portion 153 is inserted into the shaft hole 172a of the photoconductor shaft 172 to arrange the through-hole 153a of the shaft portion 153 and the through-hole 172b of the photoconductor shaft 172 on a substantially straight line, the male-screw member 175 is passed through the through-holes and is screwed therein. This configuration makes it possible, as described before, to prevent color deviation in an image or deviation between overlapped images due to velocity variation of the photoconductor caused by decentering between the photoconductor shaft 172 and the shaft portion 153.

The printer according to the second embodiment includes the photoconductor shaft 172 in which the through-hole 172d that penetrates in the direction perpendicular to the axial direction is provided at the driving-side end as well as the driven-side rotating member 150 in which the shaft hole 153b into which the driving-side end of the photoconductor shaft 172 is inserted in the axial direction, the through-hole 153c that extends through in the direction perpendicular to the axial direction and that crosses the shaft hole 153b, and the two slits 153e opposed to each other that extend in the axial direction and that divides the shaft hole 153b into two are provided on the shaft portion 153. Under the condition where the driving-side end of the photoconductor shaft 172 is inserted into the shaft hole 153b of the shaft portion 153 to arrange the through-hole 171d of the photoconductor shaft 172 and the through-hole 153c of the shaft portion 153 on a substantially straight line, the male-screw member 175 is passed through the through-holes and is screwed therein. This configuration makes it possible to prevent color deviation in an image or deviation between overlapped images due to velocity variation of the photoconductor caused by decentering between the photoconductor shaft 172 and the shaft portion 153.

The printer according to the second embodiment includes the bearing 73 that supports to allow the photoconductor shaft 172 to rotate and the driven-side rotating member 150 that includes the shaft hole 153b into which the driving-side end of the photoconductor shaft 172 is inserted in the axial direction. Under this configuration where the driving-side end of the photoconductor shaft 172 is inserted into the shaft hole 153b, the driven-side end surface of the shaft portion 153 contacts the driving-side end surface of the bearing 73. This configuration makes it possible, as described before, to prevent the driven-side rotating member 150 from escaping from the bearing 73 of the photoconductor shaft 172 without using a dedicated member to prevent escaping.

The printer according to the third embodiment includes the driving-side rotating member 101 and the driven-side rotating member 150 on which marks (102a, 151b) are provided at predetermined positions in the rotating direction respectively. Under this configuration, as described before, the cup 102 and the ball holding member 151 are engaged each other to make each of the marks position at the same rotation angle, enabling easy engagement of the cup 102 and the ball holding member 151.

In the printer according to the embodiments and each example, a rotation driving force of the driving motor 100 is transmitted to the photoconductor without using a gear, thereby, it is possible to avoid velocity variation of the photoconductor caused by decentering or a mating difference of the gear.

According to the embodiments of the present invention, it is possible to transmit a driving force from a driving motor to a driven member through a constant velocity joint because a driving-side rotating member of a constant velocity joint is directly connected to a rotor of the driving motor. In addition, a driving-side rotation shaft is directly connected to the rotor and functions as a driving shaft of the driving motor. Thus, it is unnecessary to connect the driving-side rotating member to the driving shaft. This makes it possible to avoid shaft misalignment based on connection between the driving-side rotating member and the driving shaft and velocity variation due to the shaft misalignment.

Although the invention has been described with respect to a specific embodiment for a complete and clear disclosure, the appended claims are not to be thus limited but are to be construed as embodying all modifications and alternative constructions that may occur to one stilled in the art that fairly fall within the basic teaching herein set forth.

What is claimed is:

1. A drive transmitting device comprising:
   a constant velocity joint that transmits a rotation driving force between a driving-side rotating member and a driven-side rotating member that align in an axial direction and engage each other; and
   a driving motor that is connected to the driving-side rotating member, wherein
   a rotation driving force of the driving motor is transmitted to a driven member through the constant velocity joint,
   any one of the driving-side rotating member and the driven-side rotating member includes
   an outer ring,
   an inner ring that is located inside the outer ring,
   a cylindrical space between the outer ring and the inner ring, and
   a plurality of grooves that extend in an axial direction of the cylindrical space and are located on at least one of the inner peripheral surface of the outer ring and the outer peripheral surface of the inner ring to align in a circular direction,
   the other one of the driving-side rotating member and the driven-side rotating member includes
   a ball holding member that holds a plurality of balls in a plurality of through-holes in a cylindrical peripheral wall that align in a circumferential direction,
   the constant velocity joint transmits the rotation driving force between the driving-side rotating member and the driven-side rotating member via the balls when the ball holding member is arranged in the cylindrical space and the balls are engaged in the grooves, and
   the driving-side rotating member extends inside the driving motor and is directly connected to a rotor as a driving shaft of the driving motor.

2. The drive transmitting device according to claim 1, wherein at least one of the grooves includes any one of a protrusion that protrudes from a bottom surface of the groove and a protrusion that protrudes in a height direction of the groove from the bottom surface at an end of the groove in an axial direction.

3. The drive transmitting device according to claim 1 further comprising a connecting shaft that is connected to a driven-side end of the driven-side rotating member and is driven and rotates.

4. The drive transmitting apparatus according to claim 1, wherein the driving-side rotating member extends inside a center hole of a columnar bearing of the driving motor such that the driving-side rotating member is directly connected to the rotor inside the driving motor.

5. A drive transmitting device comprising:
   a constant velocity joint that transmits a rotation driving force between a driving-side rotating member and a driven-side rotating member that align in an axial direction and engage each other;
   a driving motor that is connected to the driving-side rotating member; and
   a connecting shaft that is connected to a driven-side end of the driven-side rotating member and is driven and rotates, wherein
   a rotation driving force of the driving motor is transmitted to a driven member through the constant velocity joint,
   any one of the driving-side rotating member and the driven-side rotating member includes
   an outer ring,
   an inner ring that is located inside the outer ring,
   a cylindrical space between the outer ring and the inner ring, and
   a plurality of grooves that extend in an axial direction of the cylindrical space and are located on at least one of the inner peripheral surface of the outer ring and the outer peripheral surface of the inner ring to align in a circular direction,
   the other one of the driving-side rotating member and the driven-side rotating member includes
   a ball holding member that holds a plurality of balls in a plurality of through-holes in a cylindrical peripheral wall that align in a circumferential direction, the constant velocity joint transmits the rotation driving force between the driving-side rotating member and the driven-side rotating member via the balls when the ball holding member is arranged in the cylindrical space and the balls are engaged in the grooves, the driving-side rotating member is directly connected to a rotor as a driving shaft of the driving motor, the driven-side rotating member includes a first through-hole that penetrates in a direction perpendicular to the axial direction at a driven-side end, the connecting shaft includes
- a shaft hole in which the driven-side end of the driven-side rotating member is arranged in the axial direction,
- a second through-hole that penetrates in a direction perpendicular to the axial direction and crosses the shaft hole, and
- two slits opposed to each other that extend in the axial direction and divide the shaft hole into two sections, and the driven-side end of the driven-side rotating member is arranged in the shaft hole, and the first through-hole and the second through-hole are aligned in a line to screw a male-screw member into the first through-hole and the second through-hole.

6. A drive transmitting device comprising:

a constant velocity joint that transmits a rotation driving force between a driving-side rotating member and a driven-side rotating member that align in an axial direction and engage each other;

a driving motor that is connected to the driving-side rotating member; and a connecting shaft that is connected to a driven-side end of the driven-side rotating member and is driven and rotates, wherein a rotation driving force of the driving motor is transmitted to a driven member through the constant velocity joint, any one of the driving-side rotating member and the driven-side rotating member includes
- an outer ring,
- an inner ring that is located inside the outer ring,
- a cylindrical space between the outer ring and the inner ring, and
- a plurality of grooves that extend in an axial direction of the cylindrical space and are located on at least one of the inner peripheral surface of the outer ring and the outer peripheral surface of the inner ring to align in a circular direction, the other one of the driving-side rotating member and the driven-side rotating member includes
- a ball holding member that holds a plurality of balls in a plurality of through-holes in a cylindrical peripheral wall that align in a circumferential direction, the constant velocity joint transmits the rotation driving force between the driving-side rotating member and the driven-side rotating member via the balls when the ball holding member is arranged in the cylindrical space and the balls are engaged in the grooves, the driving-side rotating member is directly connected to a rotor as a driving shaft of the driving motor, the connecting shaft includes a first through-hole that penetrates in a direction perpendicular to the axial direction at a driving-side end, the driven-side rotating member includes
- a shaft hole in which the driving-side end of the connecting shaft is arranged in the axial direction,
- a second through-hole that penetrates in a direction perpendicular to the axial direction and crosses the shaft hole, and
- two slits opposed to each other that extend in the axial direction and divide the shaft hole into two sections, and the driving-side end of the connecting shaft is arranged in the shaft hole, and the first through-hole and the second through-hole are aligned in a line to screw a male-screw member into the first through-hole and the second through-hole.

7. A drive transmitting device comprising:

a constant velocity joint that transmits a rotation driving force between a driving-side rotating member and a driven-side rotating member that align in an axial direction and engage each other;

a driving motor that is connected to the driving-side rotating member;

a connecting shaft that is connected to a driven-side end of the driven-side rotating member and is driven and rotates; and a bearing that rotatably supports the connecting shaft, wherein a rotation driving force of the driving motor is transmitted to a driven member through the constant velocity joint, any one of the driving-side rotating member and the driven-side rotating member includes
- an outer ring,
- an inner ring that is located inside the outer ring,
- a cylindrical space between the outer ring and the inner ring, and
- a plurality of grooves that extend in an axial direction of the cylindrical space and are located on at least one of the inner peripheral surface of the outer ring and the outer peripheral surface of the inner ring to align in a circular direction, the other one of the driving-side rotating member and the driven-side rotating member includes
- a ball holding member that holds a plurality of balls in a plurality of through-holes in a cylindrical peripheral wall that align in a circumferential direction, the constant velocity joint transmits the rotation driving force between the driving-side rotating member and the driven-side rotating member via the balls when the ball holding member is arranged in the cylindrical space and the balls are engaged in the grooves, the driving-side rotating member is directly connected to a rotor as a driving shaft of the driving motor, the driven-side rotating member includes a shaft hole in which the driving-side end of the connecting shaft is arranged in the axial direction, and the driven-side end of the driven-side rotating member contacts the driving-side end of the bearing when the driving-side end of the connecting shaft is arranged in the shaft hole.

8. A drive transmitting device comprising:

a constant velocity joint that transmits a rotation driving force between a driving-side rotating member and a driven-side rotating member that align in an axial direction and engage each other; and a driving motor that is connected to the driving-side rotating member, wherein a rotation driving force of the driving motor is transmitted to a driven member through the constant velocity joint, any one of the driving-side rotating member and the driven-side rotating member includes
- an outer ring, an inner ring that is located inside the outer ring,
a cylindrical space between the outer ring and the inner ring, and
a plurality of grooves that extend in an axial direction of the cylindrical space and are located on at least one of the inner peripheral surface of the outer ring and the outer peripheral surface of the inner ring to align in a circular direction, the other one of the driving-side rotating member and the driven-side rotating member includes
a ball holding member that holds a plurality of balls in a plurality of through-holes in a cylindrical peripheral wall that align in a circumferential direction, the constant velocity joint transmits the rotation driving force between the driving-side rotating member and the driven-side rotating member via the balls when the ball holding member is arranged in the cylindrical space and the balls are engaged in the grooves, the driving-side rotating member is directly connected to a rotor as a driving shaft of the driving motor, and the driving-side rotating member and the driven-side rotating member include a mark at a predetermined position in a rotation direction.

9. An image forming apparatus comprising:
an image carrying member that carries a visible image on an endless moving surface;
a visible-image forming member that forms a visible image on the endless moving surface; and
a drive transmitting device that transmits a driving force to the image carrying member, and includes
a constant velocity joint that transmits a rotation driving force between a driving-side rotating member and a driven-side rotating member that align in an axial direction and engage each other, and
a driving motor that is connected to the driving-side rotating member, wherein
a rotation driving force of the driving motor is transmitted to a driven member through the constant velocity joint, any one of the driving-side rotating member and the driven-side rotating member includes
an outer ring,
an inner ring that is located inside the outer ring,
a cylindrical space between the outer ring and the inner ring, and
a plurality of grooves that extend in an axial direction of the cylindrical space and are located on at least one of the inner peripheral surface of the outer ring and the outer peripheral surface of the inner ring to align in a circular direction, the other one of the driving-side rotating member and the driven-side rotating member includes
a ball holding member that holds a plurality of balls in a plurality of through-holes in a cylindrical peripheral wall that align in a circumferential direction, the constant velocity joint transmits the rotation driving force between the driving-side rotating member and the driven-side rotating member via the balls when the ball holding member is arranged in the cylindrical space and the balls are engaged in the grooves, and the driving-side rotating member extends inside the drivng motor and is directly connected to a rotor as a driving shaft of the driving motor.

10. The image forming apparatus according to claim 9, wherein the image carrying member and the drive transmitting device align in a line, and the rotation driving force of the driving motor is transmitted to the image carrying member not through a gear.

11. The image forming apparatus of claim 9, wherein the driving-side rotating member extends inside a center hole of a columnar bearing of the driving motor such that the driving-side rotating member is directly connected to the rotor inside the driving motor.

12. An image forming apparatus comprising:
a latent image carrying member that carries a latent image on an endless moving surface;
a developing member that develops the latent image on the latent image carrying member by a developer carried on the endless moving surface; and
a drive transmitting device that transmits a driving force to any one of the latent image carrying member and the developing member, and includes
a constant velocity joint that transmits a rotation driving force between a driving-side rotating member and a driven-side rotating member that align in an axial direction and engage each other, and
a driving motor that is connected to the driving-side rotating member, wherein
a rotation driving force of the driving motor is transmitted to a driven member through the constant velocity joint, any one of the driving-side rotating member and the driven-side rotating member includes
an outer ring,
an inner ring that is located inside the outer ring,
a cylindrical space between the outer ring and the inner ring, and
a plurality of grooves that extend in an axial direction of the cylindrical space and are located on at least one of the inner peripheral surface of the outer ring and the outer peripheral surface of the inner ring to align in a circular direction, the other one of the driving-side rotating member and the driven-side rotating member includes
a ball holding member that holds a plurality of balls in a plurality of though-holes in a cylindrical peripheral wall that align in a circumferential direction, the constant velocity joint transmits the rotation driving force between the driving-side rotating member and the driven-side rotating member via the balls when the ball holding member is arranged in the cylindrical space and the balls are engaged in the grooves, and the driving-side rotating member extends inside the driving motor and is directly connected to a rotor as a driving shaft of the driving motor.

13. The image forming apparatus according to claim 12, wherein any one of the latent image carrying member and the developing member and the drive transmitting device align in a line, and the rotation driving force of the driving motor is transmitted to any one of the latent image carrying member and the developing member not through a gear.

14. The image forming apparatus of claim 12, wherein the driving-side rotating member extends inside a center hole of a columnar bearing of the driving motor such that the driving-side rotating member is directly connected to the rotor inside the driving motor.

* * * * *